(12) United States Patent
Takeyama

(10) Patent No.: US 7,589,872 B2
(45) Date of Patent: Sep. 15, 2009

(54) IMAGING APPARATUS

(75) Inventor: Tetsuhide Takeyama, Hachioji (JP)

(73) Assignee: Olympus Corporation, Tokyo (JP)

( * ) Notice: Subject to any disclaimer, the term of this patent is extended or adjusted under 35 U.S.C. 154(b) by 995 days.

(21) Appl. No.: 10/869,900

(22) Filed: Jun. 18, 2004

(65) Prior Publication Data
US 2005/0219648 A1 Oct. 6, 2005

(30) Foreign Application Priority Data
Jul. 24, 2003 (JP) ............... 2003-279318

(51) Int. Cl.
H04N 1/04 (2006.01)
(52) U.S. Cl. .................. 358/511; 358/514; 358/481; 358/474
(58) Field of Classification Search ............ 358/511, 358/514, 481, 474, 475
See application file for complete search history.

(56) References Cited

U.S. PATENT DOCUMENTS

| | | | |
|---|---|---|---|
| 5,233,170 A * | 8/1993 | Metlitsky et al. ...... 235/462.35 |
| 5,578,813 A * | 11/1996 | Allen et al. ............. 250/208.1 |
| 5,969,877 A | 10/1999 | Maeda | |
| 5,988,506 A | 11/1999 | Schaham et al. | |
| 6,184,515 B1 * | 2/2001 | Bohn ...................... 250/208.1 |
| 6,659,350 B2 * | 12/2003 | Schwartz et al. ....... 235/462.42 |
| 6,878,922 B1 * | 4/2005 | Bohn ......................... 250/216 |
| 6,888,649 B2 * | 5/2005 | Suzuki ....................... 358/1.9 |
| 7,090,133 B2 * | 8/2006 | Zhu ....................... 235/462.01 |
| 2003/0011675 A1 | 1/2003 | Ishibe et al. | |

FOREIGN PATENT DOCUMENTS

| | | |
|---|---|---|
| JP | 06-082691 | 3/1994 |
| JP | 08-307761 | 11/1996 |
| JP | 08-317147 | 11/1996 |

OTHER PUBLICATIONS

European Search Report for European Application No. 04014386.9-2217.

* cited by examiner

Primary Examiner—Houshang Safaipour
(74) Attorney, Agent, or Firm—Kenyon & Kenyon LLP

(57) ABSTRACT

An imaging apparatus includes, in order from the object side, a one-dimensional scanning mirror, a lens unit which has a flat shape, a two-dimensional image sensor which has a flat shape, and an image composition processing means in which images scanned by the one-dimensional scanning mirror and obtained by the two-dimensional image sensor are connected into one composite image. The lens unit coincides in direction of flatness with the two-dimensional image sensor. An aspect ratio $\alpha$ of the imaging surface of the two-dimensional image sensor satisfies the following condition:

$$0.05 < \alpha < 0.5$$

One section of an image divided into 2 to 32 sections with respect to one composite image composed through the image composition processing means corresponds to a photographing image obtained by the two-dimensional image sensor in a single scanning operation.

7 Claims, 8 Drawing Sheets

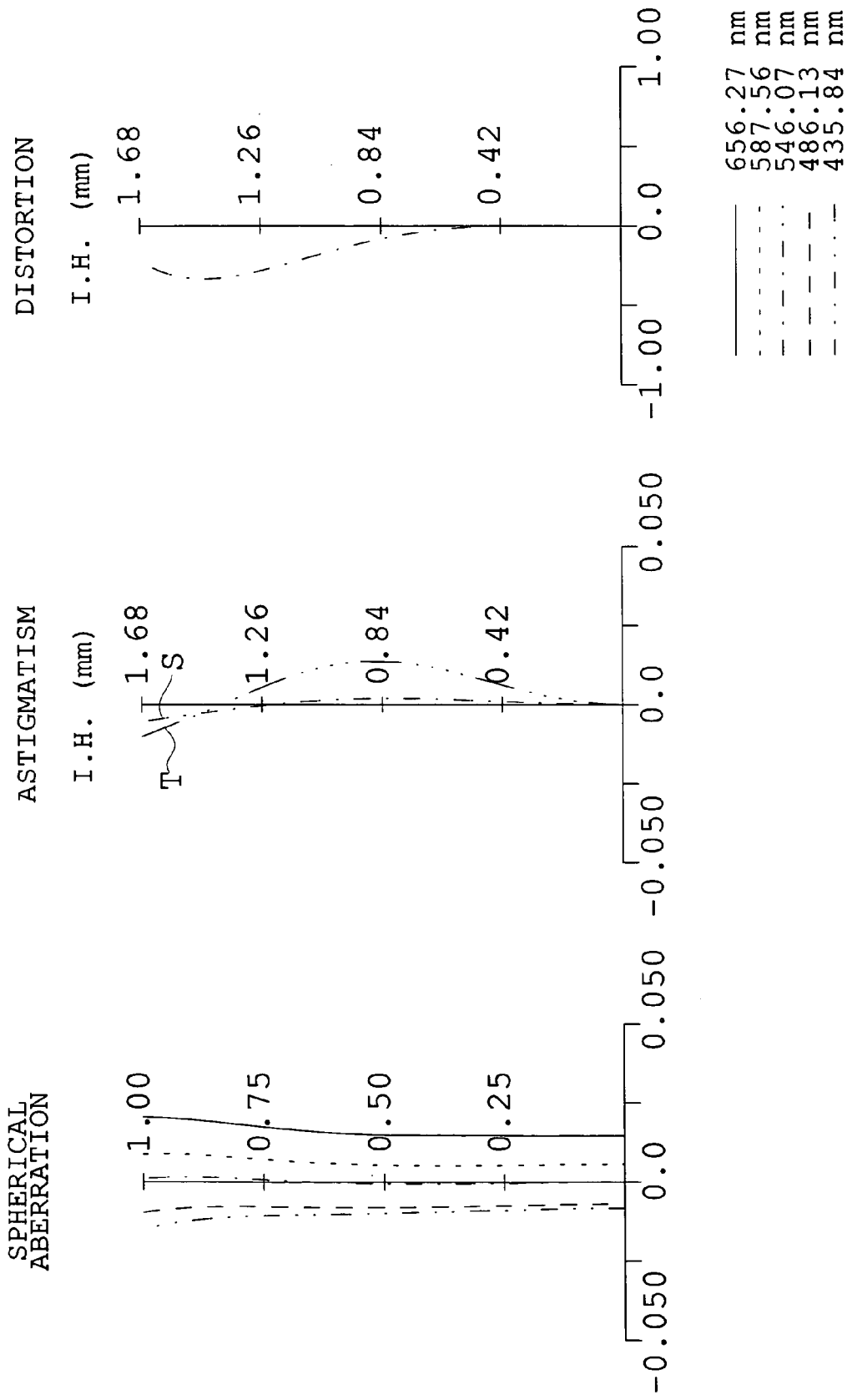

ROTATION AXIS

ROTATION AXIS

IMAGING APPARATUS

BACKGROUND OF THE INVENTION

1. Field of the Invention

This invention relates to an imaging apparatus of a compact and slim design in which an aspect ratio can be converted.

2. Description of Related Art

In a conventional imaging system, a technique of using an anamorphic converter to convert the aspect ratio of an imaging optical system is disclosed, for example, in Japanese Patent Kokai No. Hei 6-82691.

The anamorphic converter described in this prior art article is shown in FIGS. 1A and 1B. The anamorphic converter is constructed by combining cylindrical lenses G1, G2, and G3, each having optical power in only a horizontal or vertical direction of an image plane. By doing so, an effect of magnifying or demagnifying an image in only the horizontal or vertical direction of the image plane is brought about. The anamorphic converter is designed to be mountable and dismountable with respect to the imaging optical system, and thereby a photographer is capable of converting the aspect ratio of a photographing image.

SUMMARY OF THE INVENTION

The imaging apparatus according to the present invention includes, in order from the object side, a scanning mirror, an optical system which has a flat shape, a two-dimensional image sensor which has a flat shape, and an image composition processing means in which individual images scanned by the scanning mirror and obtained by the two-dimensional image sensor are connected into one composite image. In this case, the optical system coincides in direction of flatness with the two-dimensional image sensor.

In the imaging apparatus of the present invention, an aspect ratio α of the imaging surface of the two-dimensional image sensor satisfies the following condition:

$$0.05 < \alpha < 0.5 \qquad (1)$$

In the imaging apparatus of the present invention, one section of an image divided into 2 to 32 sections with respect to one composite image composed through the image composition processing means corresponds to a photographing image obtained by the two-dimensional image sensor in a single scanning operation.

These and other features and advantages of the present invention will become apparent from the following detailed description of the preferred embodiment when taken in conjunction with the accompanying drawings.

BRIEF DESCRIPTION OF THE DRAWINGS

FIGS. 4A, 4B, and 4C are diagrams showing longitudinal aberration characteristics of the imaging optical system of FIGS. 3A and 3B;

DETAILED DESCRIPTION OF THE PREFERRED EMBODIMENTS

Figure 1A:
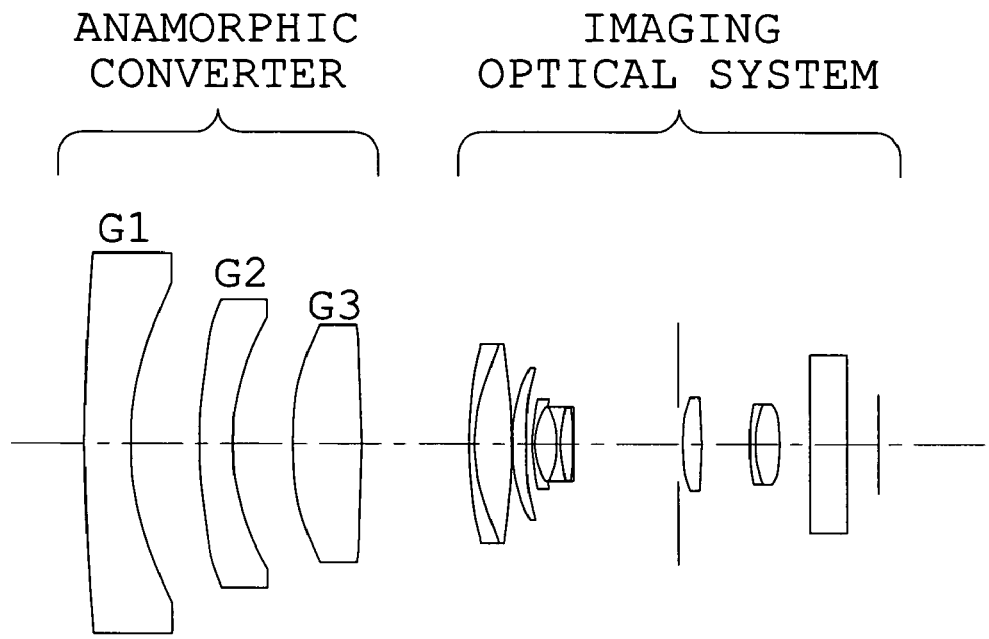
FIGS. 1A and 1B are plan and side sectional views, respectively, showing one conventional example of the conversion technique of the aspect ratio.
Figure 1B:
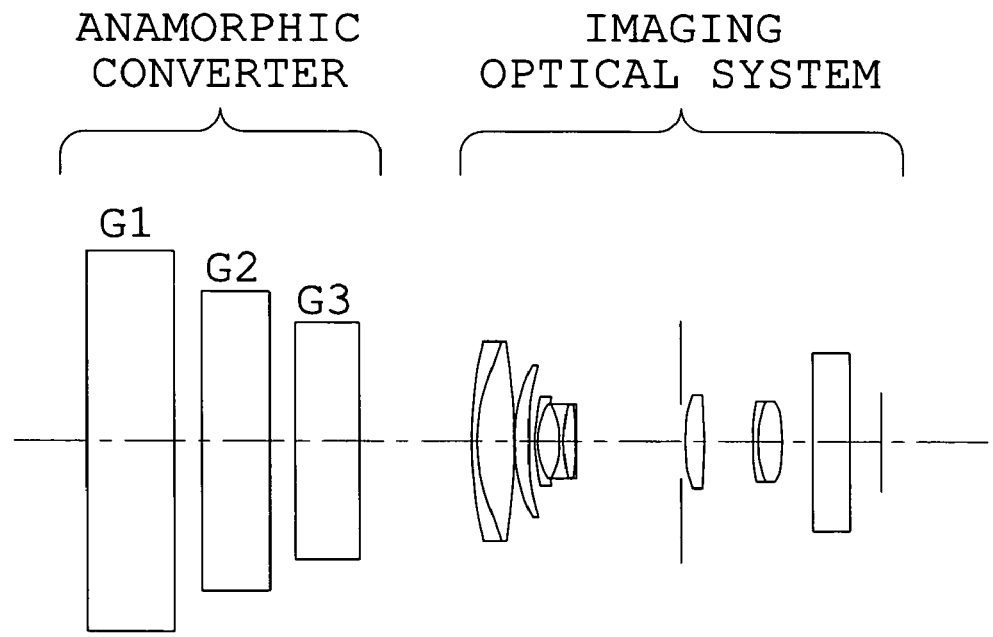

Before undertaking the description of the embodiment, the function and effect of the present invention will be explained.

In the imaging apparatus of the present invention, the number of photographing images is changed by scanning control and images are obtained so that the images are composed and a composite image is produced. Whereby, the aspect ratio can be rapidly converted without using accessories such as converters. Moreover, a starting image (a photographing starting position) of the photographing images to be composed is selected, and thereby the center of a photographing area of the composite image can be selectively changed along one direction (for example, in a horizontal direction). By using the scanning mirror, the optical path is bent and the imaging apparatus can be downsized. In addition, when the optical system and the two-dimensional image sensor which are configured into flat shapes are used in the same direction, the slim and compact design of the imaging apparatus can be achieved.

Condition (1) is adapted to achieve the compact and slim design while maintaining good image quality and defines the aspect ratio of the imaging surface of the two-dimensional image sensor.

If the aspect ratio α of the imaging surface is below the lower limit of Condition (1) and becomes small, a difference with the aspect ratio of a photographing image to which composition processing is applied (a composite image) becomes too large. This means that when the composite image is produced, a large number of images (divided sectional images) are required. However, predetermined time is required for the exposure of the two-dimensional image sensor and the read out of the image obtained. Consequently, for example, when a moving object is photographed, the blurring of the image becomes pronounced and image quality is considerably deteriorated.

If the aspect ratio α of the imaging surface is beyond the upper limit of Condition (1) and becomes large, the effective diameter area of a ray of light passing through the optical system must be enlarged. In this case, the flatness ratio of the optical system is increased and becomes approximately 1.0. As a result, the optical system becomes so bulky that the slim design of the imaging apparatus is difficult.

If the number of divided sectional images constituting one composite image is below 2, the flatness ratio of the optical system becomes approximately 1.0 due to an increase of the effective ray diameter. Consequently, the optical system becomes so bulky that the slim design of the imaging apparatus is difficult.

If the number of divided sectional images constituting one composite image is beyond 32, the difference of the aspect ratio between the divided sectional images and the photographing image to which composition processing is applied becomes too large. Thus, when the composite image is produced, a large number of images (divided sectional images) are required. However, predetermined time is required for the exposure of the two-dimensional image sensor and the read out of the image obtained. Consequently, for example, when a moving object is photographed, the blurring of the image becomes pronounced and image quality is considerably deteriorated.

In the present invention, the optical system is configured into a flat shape (for example, an oval coin shape). Specifically, the optical system is configured so that the thickness is made small (the contour size is made small) in the same direction as the short-side direction of the imaging surface of the two-dimensional image sensor which has a flat shape. By doing so, the compact and slim design of the imaging apparatus can be realized.

In the present invention, the scanning mirror can be constructed as an MEMS (micro-electro-mechanical system) gimbal mirror. Alternatively, it may be constructed as a one-dimensional rotating mirror that has a reflecting surface making a different reflection angle in accordance with rotation.

It is desirable that the imaging apparatus of the present invention is applied to a card with a thickness of 1-5 mm. A card whose thickness is below 1 mm is so thin that the fabrication of the imaging apparatus becomes difficult. Beyond 5 mm, the card is too thick.

In accordance with the drawings, the embodiment of the present invention will be described below.

Figure 2A:
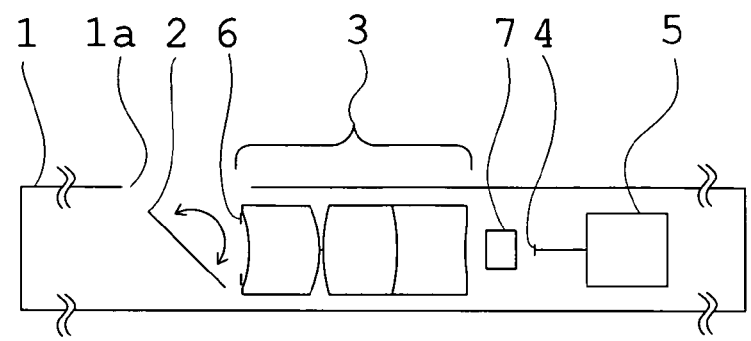
FIGS. 2A and 2B are plan and side sectional views, respectively, showing schematically one embodiment of the imaging apparatus according to the present invention.
Figure 2B:
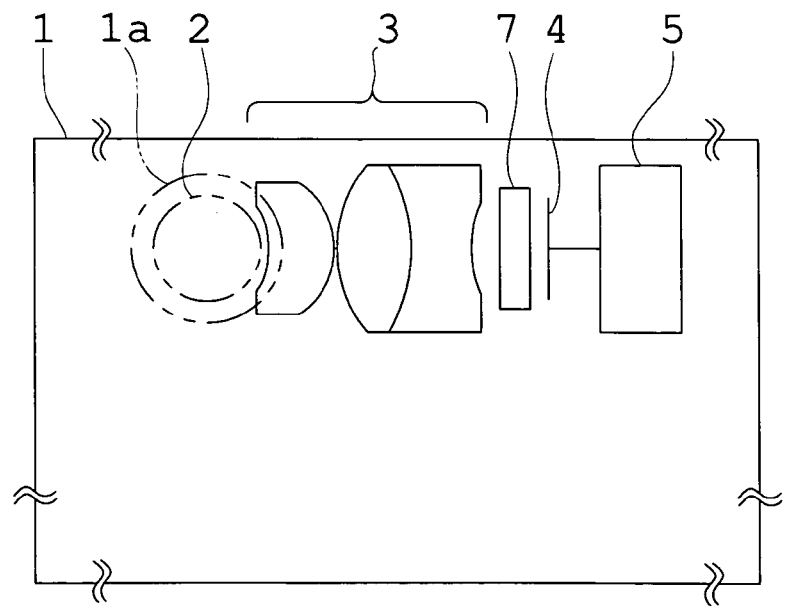
Figure 3A:
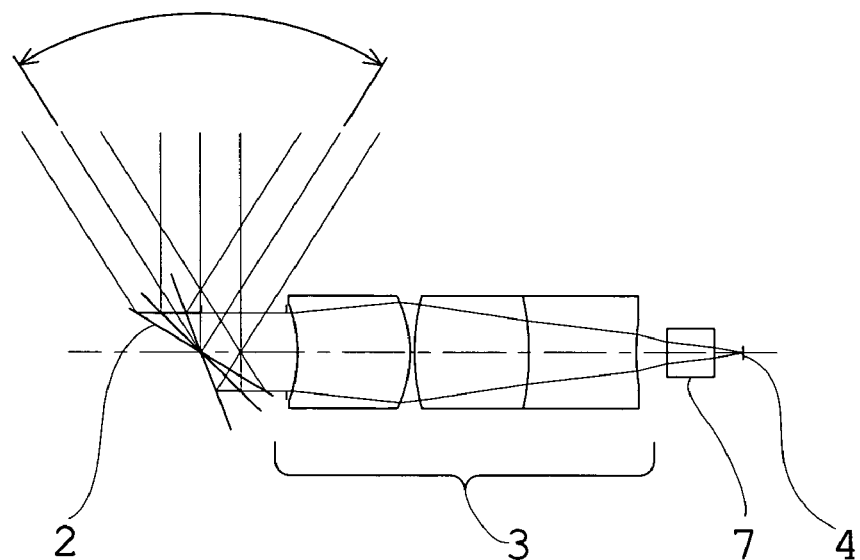
FIGS. 3A and 3B are plan and side sectional views, respectively, showing a partially enlarged imaging optical system of the imaging apparatus of the embodiment.
Figure 3B:
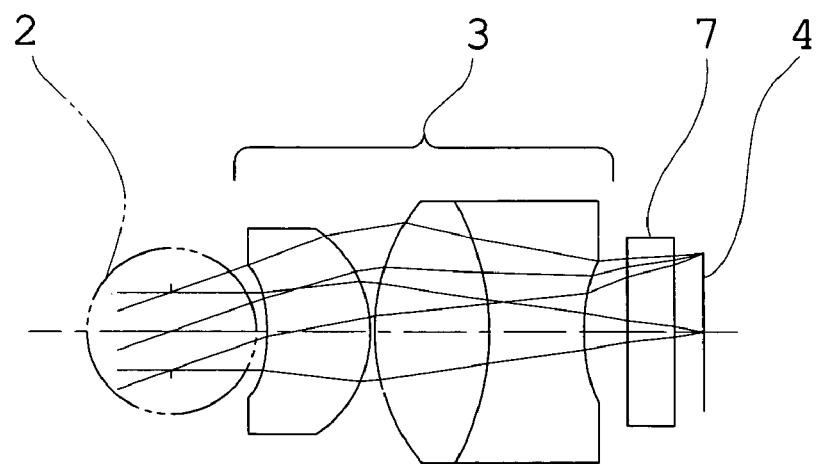

FIGS. 2A and 2B show the imaging apparatus of the embodiment. FIGS. 3A and 3B show the imaging optical system of the imaging apparatus of the embodiment. FIGS. 4A-4C show longitudinal aberration characteristics of the imaging optical system.

Figure 5A:
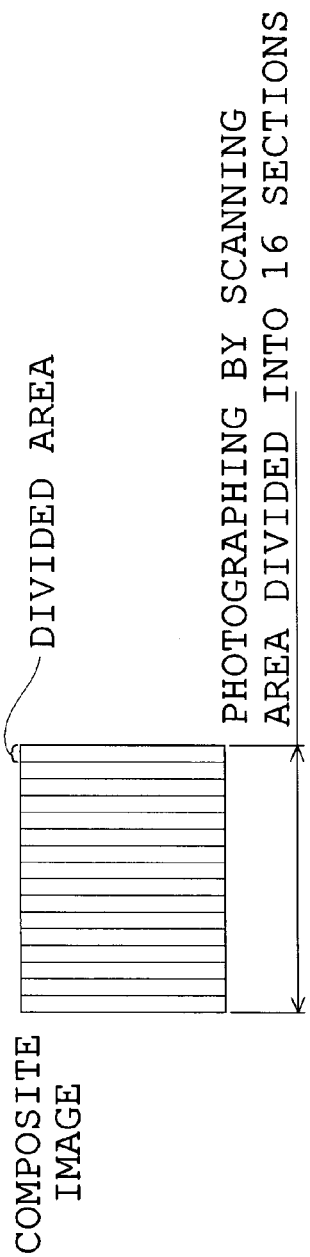
FIGS. 5A, 5B, and 5C are explanatory views showing examples of photographing images where the aspect ratios of composite images are 3:4, arbitrary, and 16:9, respectively, in the imaging apparatus of the embodiment.
Figure 5B:
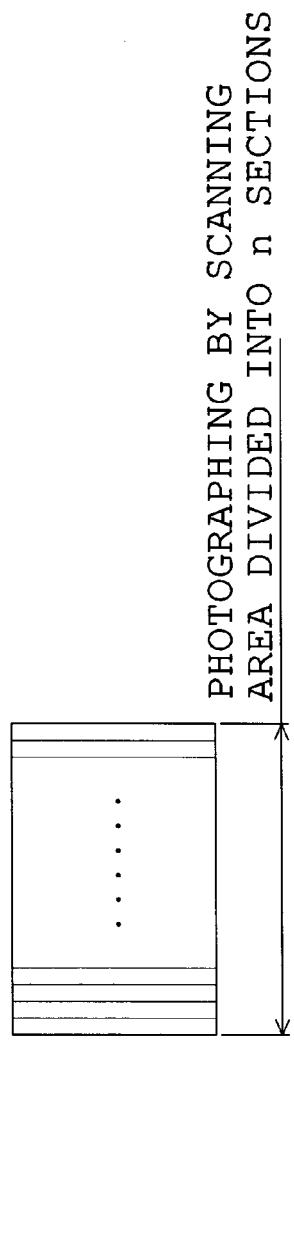
Figure 5C:
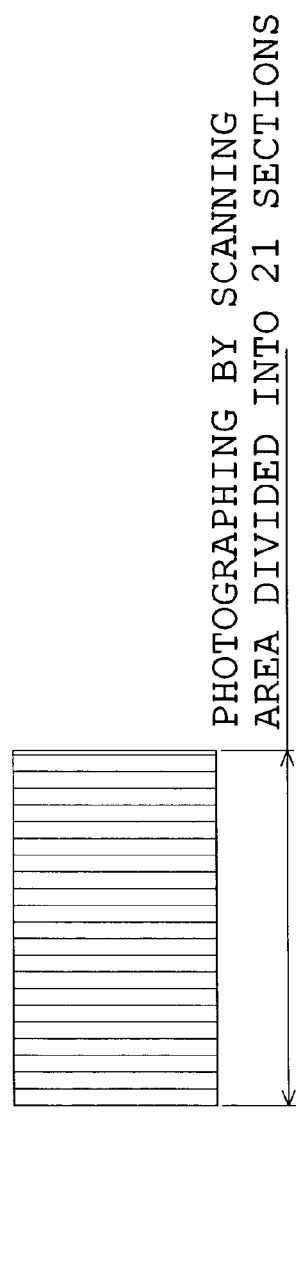
Figure 6:
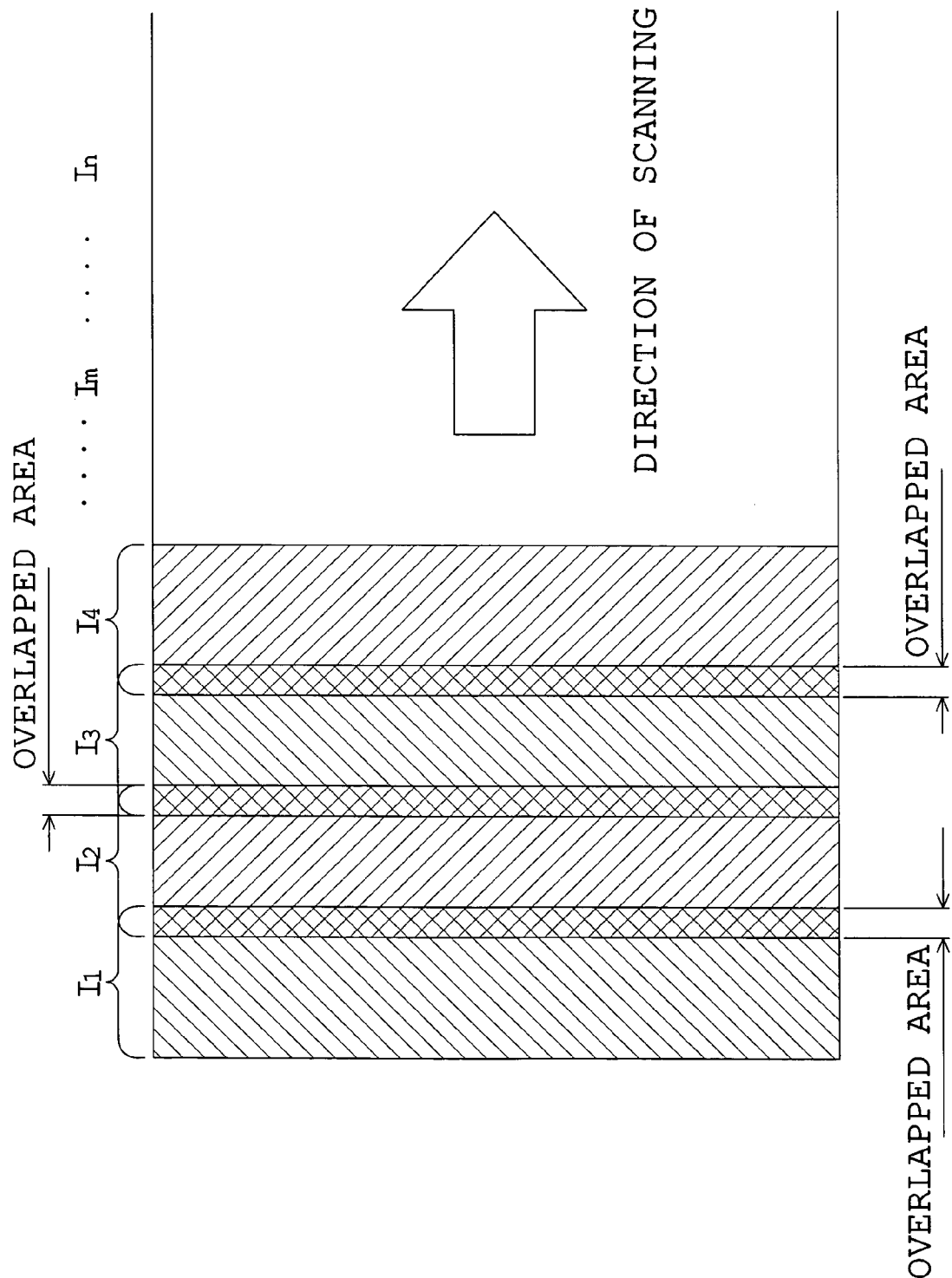
FIG. 6 is an explanatory view showing a modified example of a photographing image relative to a composite image in the imaging apparatus of the embodiment.

FIGS. 5A-5C show examples of photographing images in the imaging apparatus of the embodiment. FIG. 6 shows a modified example of the photographing image relative to the composite image in the imaging apparatus of the embodiment.

The imaging apparatus of the embodiment includes a one-dimensional scanning mirror 2, a lens unit 3, a two-dimensional image sensor 4, and an image composition processing means 5, inside a card body housing 1. The two-dimensional image sensor 4 images an area scanned by the one-dimensional scanning mirror 2. The image composition processing means 5 connects individual images picked up by the two-dimensional image sensor 4 into one composite image. In the figures, reference numeral 1a denotes a photographing opening, 6 denotes an aperture stop, and 7 denotes a cover glass for the two-dimensional image sensor which has a flat shape.

The one-dimensional scanning mirror 2 is constructed as the MEMS (micro-electro-mechanical system) gimbal mirror.

The lens unit 3 has different contour sizes in two directions perpendicular to each other and assumes a flat shape. The direction of flatness is such that the contour size in a direction in which a ray is deflected by the one-dimensional scanning mirror 2 is small. Here, as will be described later, the imaging surface of the two-dimensional image sensor 4 also assumes a flat shape. The lens unit 3 is thus placed so that the thickness in the same direction as the short-side direction of the imaging surface of the two-dimensional image sensor 4 becomes small. That is, the optical system 3 which had a flat shape coincides in direction of flatness with the two-dimensional image sensor 4 which has a flat shape.

The two-dimensional image sensor 4 also has the flat shape. More specifically, the imaging surface assumes the flat shape. The aspect ratio α of the imaging surface satisfies Condition (1).

The two-dimensional image sensor 4 has the number of pixels such that a photographing image divided into 2 to 32 sections is obtained with respect to one composite image. In the imaging apparatus of the embodiment, one composite image is produced through the image composition processing means 5. In this case, to produce the composite image, an image divided into arbitrary n sections (n is an integer of 2-32) is used. The imaging apparatus of the embodiment is thus constructed so that one of n sections into which the image is divided corresponds to a photographing image obtained by a single scanning operation. The number of sections into which the image is divided depends on the rotating speed of the scanning mirror 2 and the imaging time of the two-dimensional image sensor 4.

As shown in FIG. 5A, for instance, when an area divided into 16 sections is scanned and imaged to obtain divided sectional images, which are composed, the aspect ratio of the composite image is 3:4. As shown in FIG. 5C, when an area divided into 21 sections is scanned and imaged to obtain divided sectional images, which are composed, the aspect ratio of the composite image is 16:9. Thus, the imaging apparatus of the embodiment is designed so that the area divided into n (where n is an integer, $2 \leq n \leq 32$) sections is scanned and the aspect ratio of the composite image can be arbitrarily changed. The imaging time of the two-dimensional image sensor 4 and the scanning speed of the scanning mirror 2 in the single scanning operation is governed by the number of divided sections of one composite image where the composite image is produced by a single shutter operation (single photographing).

In the imaging apparatus of the embodiment constructed as mentioned above, the image is scanned n times in a one-dimensional direction by changing the angle of the one-dimensional scanning mirror 2, and, of light incident from the opening 1a, light, in a preset photographing area, split by the one-dimensional scanning mirror 2 is reflected by the one-dimensional scanning mirror 2 and is imaged through the lens unit 3 and the cover glass 7 by the two-dimensional image sensor 4. The images formed in individual scanning operations are connected by the image composition processing means 5. When n scanning operations are completed, one composite image is produced.

Subsequently, numerical data of optical members constituting the imaging optical system of the imaging apparatus in the embodiment are shown below.

Also, when z is taken as the coordinate in the direction of the optical axis, y is taken as the coordinate in a direction perpendicular to the optical axis, K is a conic constant, and A, B, C, and D are aspherical coefficients, the configuration of an aspherical surface is expressed by the following equation:

$$z=(y^2/r)/[1+\{1-(1+K)(y/r)^2\}^{1/2}]+Ay^4+By^6+Cy^8+Dy^{10}$$

| Numerical data 1 | | | | |
|---|---|---|---|---|
| Focal length: 4.65 mm | | | | |
| F-number: 2.8 | | | | |
| Image height: 1.68 mm | | | | |
| Surface number | Radius of curvature (mm) | Surface spacing (mm) | Refractive index (d-line) | Abbe's number |
| Object surface | ∞ | ∞ | | |
| Aperture stop | ∞ | 2.000 | | |
| 2 | −3.687 | 2.154 | 1.69350 | 53.2 |
| 3 | −2.896 | 0.100 | | |
| 4 | 4.440 | 2.412 | 1.74330 | 49.3 |

-continued

Numerical data 1

| 5 | −5.702 | 2.000 | 1.84666 | 23.8 |
| 6 | 4.660 | 0.914 | | |
| 7 | ∞ | 1.000 | 1.51633 | 64.1 |
| 8 | ∞ | 0.605 | | |
| Image plane | ∞ | 0.000 | | |

Aspherical data

Second surface

K = 4.558237
A = −0.435904 × 10$^{-2}$  B = −0.315536 × 10$^{-2}$  C = 0.682960 × 10$^{-3}$
D = 0.367140 × 10$^{-3}$

Third surface

K = 0.372397
A = −0.479874 × 10$^{-2}$  B = 0.738046 × 10$^{-3}$  C = −0.740595 × 10$^{-5}$
D = 0.519471 × 10$^{-5}$

Fourth surface

K = −3.668441
A = 0.159853 × 10$^{-2}$  B = 0.665283 × 10$^{-3}$  C = −0.163756 × 10$^{-4}$
D = −0.278468 × 10$^{-5}$

Sixth surface

K = 3.304163
A = 0.765822 × 10$^{-2}$  B = −0.278814 × 10$^{-2}$  C = 0.101811 × 10$^{-2}$
D = −0.755198 × 10$^{-4}$

In imaging surface of the two-dimensional image sensor which has a flat shape, the pixel size is 2.8 μm, the number of pixels is 1200 pixels×100 pixels, and the maximum size of the optical surface of the lens unit of the flat shape is 2.4 mm×5.56 mm.

The thickness of the card body housing 1 in the embodiment is designed in the range from 2.4 mm to 5 mm.

According to the imaging apparatus of the embodiment, since photographing images in individual scanning operations by the scanning mirror are composed so that one image is produced, the number of photographing images to be composed is counted and thereby the aspect ratio can be changed. Consequently, the aspect ratio can be rapidly changed without using accessories such as conventional converters.

By selecting a starting image of the photographing images to be composed, the center of a photographing area of the composite image can be selectively changed along one direction (for example, in a horizontal direction).

Furthermore, the scanning mirror 2 is used to bend the optical path and hence the imaging apparatus can be downsized accordingly. In addition, since the optical system 3 and the two-dimensional image sensor 4 are configured into flat shapes in the same direction, the slim and compact design of the imaging apparatus can be achieved.

In the imaging apparatus of the embodiment, the images are picked up by the two-dimensional image sensor 4 and are connected by the image composition processing means 5. In this case, the reflection angle of the one-dimensional scanning mirror 2 and image composition processing by the image composition processing means 5 may be controlled so that, as shown in FIG. 6, adjacent scanning images $I_1, I_2, I_3, \ldots, I_m$ (m≦n) are connected by overlapping in partial regions. Even when the imaging apparatus is constructed in this manner, the aspect ratio of the composite image can be changed at will.

Figure 7A:
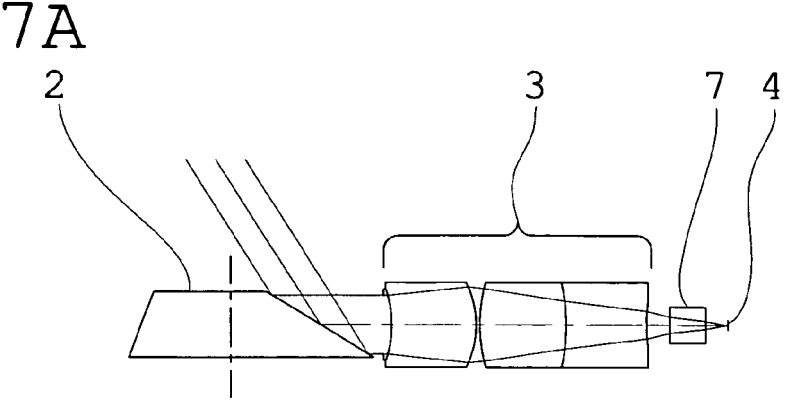
FIGS. 7A, 7B, and 7C are views showing schematically a modified example where a variable-angle prismatic rotating mirror is used as a one-dimensional scanning mirror and is rotated in different directions in the imaging optical system of the embodiment.
Figure 7B:
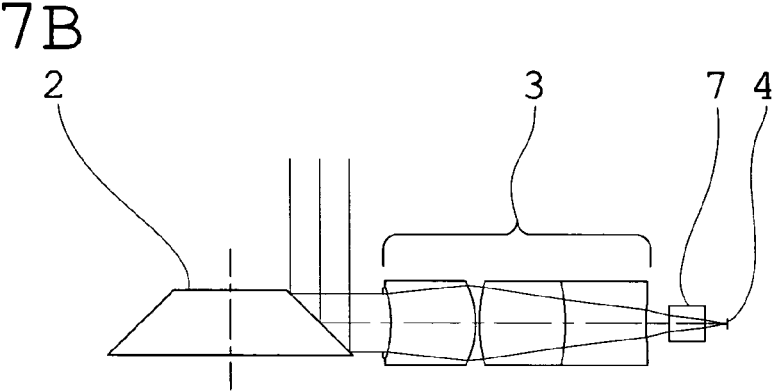
Figure 7C:
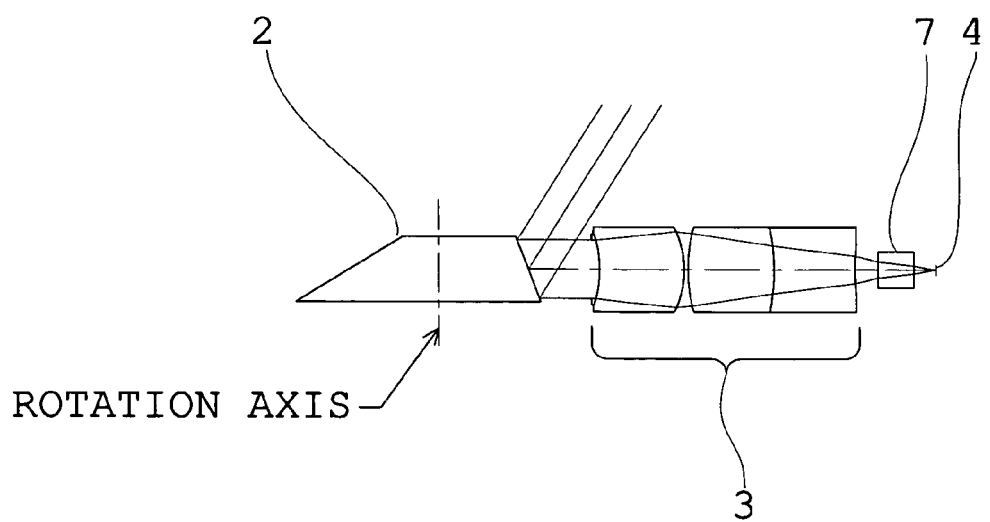

Also, although in FIGS. 2A and 2B and FIGS. 3A and 3B the one-dimensional scanning mirror 2 is constructed as the MEMS gimbal mirror, it may be constructed, as shown in FIGS. 7A-7C, using the variable-angle rotating mirror.

Figure 8A:
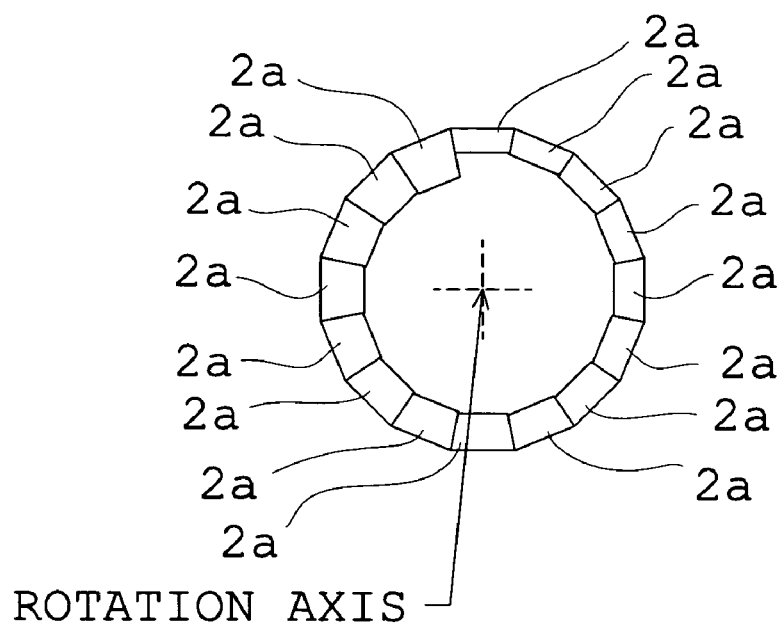
FIGS. 8A and 8B are plan and side views, respectively, explaining the variable-angle prismatic rotating mirror used in the modified example of FIGS. 7A-7C.
Figure 8B:
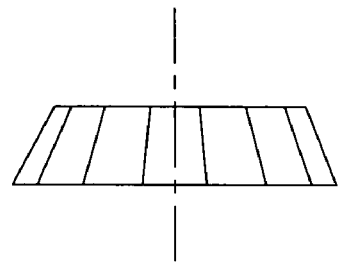

FIGS. 7A-7C show the variable-angle prismatic rotating mirror used as the one-dimensional scanning mirror 2 of the imaging optical system of the embodiment. FIGS. 8A and 8B show the variable-angle prismatic rotating mirror used in a modified example of FIGS. 7A-7C.

The variable-angle prismatic rotating mirror, as shown in FIG. 8A, is constructed so that a plurality of reflecting surfaces 2a in which reflection angles are continuously varied in accordance with rotation are provided on the periphery.

As shown in FIGS. 7A-7C, by rotating the variable-angle rotating mirror, the reflection angle of the reflecting surface 2a is changed, and a preset photographing area is scanned with split light, of light incident from the opening 1a. After that, one composite image is produced through the same processing as in the imaging apparatus shown in FIGS. 2A and 2B and FIGS. 3A and 3B.

According to the present invention, as will be clear from the above description, various kinds of aspect ratios can be rapidly obtained without using converters, and the imaging apparatus of the compact and slim design is attained.

What is claimed is:

1. An imaging apparatus comprising, in order from an object side:
   a scanning mirror;
   an optical system which has a flat shape;
   a two-dimensional image sensor which has a flat shape; and
   image composition processing means for connecting individual images scanned by the scanning mirror and obtained by the two-dimensional image sensor into one composite image,
   wherein the optical system coincides in direction of flatness with the two-dimensional image sensor, and
   wherein an aspect ratio α of an imaging surface of the two-dimensional image sensor satisfies the following condition:

$0.05 < \alpha < 0.5$.

2. An imaging apparatus according to claim 1, wherein one section of an image divided into 2 to 32 sections with respect to one composite image composed through the image composition processing means corresponds to a photographing image obtained by the two-dimensional image sensor in a single scanning operation.

3. An imaging apparatus comprising, in order from an object side:
   a scanning mirror;
   an optical system which has a flat shape;
   a two-dimensional image sensor which has a flat shape; and
   image composition processing means for connecting individual images scanned by the scanning mirror and obtained by the two-dimensional image sensor into one composite image,
   wherein the optical system coincides in direction of flatness with the two-dimensional image sensor,
   wherein the optical system has a plurality of lenses arranged to have a common axis passing through each of the lenses, and
   wherein the optical system which has a flat shape is constructed so that a thickness in the same direction as a transverse direction of an imaging surface of the two-dimensional image sensor becomes small.

4. An imaging apparatus comprising, in order from an object side:
   a scanning mirror;
   an optical system which has a flat shape;
   a two-dimensional image sensor which has a flat shape; and
   image composition processing means for connecting individual images scanned by the scanning mirror and obtained by the two-dimensional image sensor into one composite image, wherein the optical system coincides in direction of flatness with the two-dimensional image sensor, wherein the optical system has a plurality of lenses arranged to have a common axis passing through each of the lenses, and wherein the scanning mirror is constructed as an MEMS gimbal mirror.

5. An imaging apparatus comprising, in order from an object side:

a scanning mirror;

an optical system which has a flat shape;

a two-dimensional image sensor which has a flat shape; and image composition processing means for connecting individual images scanned by the scanning mirror and obtained by the two-dimensional image sensor into one composite image, wherein the optical system coincides in direction of flatness with the two-dimensional image sensor, wherein the optical system has a plurality of lenses arranged to have a common axis passing through each of the lenses, and wherein the scanning mirror is constructed as a one-dimensional rotating mirror having a plurality of reflecting surfaces in which reflection angles are continuously varied in accordance with rotation.

6. An imaging apparatus comprising, in order from an object side:

a scanning mirror;

an optical system which has a flat shape;

a two-dimensional image sensor which has a flat shape; and image composition processing means for connecting individual images scanned by the scanning mirror and obtained by the two-dimensional image sensor into one composite image, wherein the optical system coincides in direction of flatness with the two-dimensional image sensor, wherein the optical system has a plurality of lenses arranged to have a common axis passing through each of the lenses, and wherein the imaging apparatus is applied to a card with a thickness of 1-5 mm.

7. An imaging apparatus comprising, in order from an object side:

a scanning mirror;

an optical system which has a flat shape;

a two-dimensional image sensor which has a flat shape; and image composition processing means for connecting individual images scanned by the scanning mirror and obtained by the two-dimensional image sensor into one composite image, wherein the optical system coincides in direction of flatness with the two-dimensional image sensor, wherein the optical system has a plurality of lenses arranged to have a common axis passing through each of the lenses, and wherein one section of an image divided into 2 to 32 sections with respect to one composite image composed through the image composition processing means corresponds to a photographing image obtained by the two-dimensional image sensor in a single scanning operation.

* * * * *

UNITED STATES PATENT AND TRADEMARK OFFICE
CERTIFICATE OF CORRECTION

PATENT NO. : 7,589,872 B2
APPLICATION NO. : 10/869900
DATED : September 15, 2009
INVENTOR(S) : Tetsuhide Takeyama It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1455 days.

Signed and Sealed this

Twenty-first Day of September, 2010

David J. Kappos
*Director of the United States Patent and Trademark Office*